(12) United States Patent
Luo et al.

(10) Patent No.: US 12,232,088 B2
(45) Date of Patent: Feb. 18, 2025

(54) METHOD AND DEVICE FOR ALLOCATING RESOURCES FOR SIDELINK TRANSMISSION

(71) Applicant: ZTE Corporation, Shenzhen (CN)

(72) Inventors: Wei Luo, Shenzhen (CN); Lin Chen, Shenzhen (CN); Boyuan Zhang, Shenzhen (CN)

(73) Assignee: ZTE Corporation, Guangdong (CN)

( * ) Notice: Subject to any disclaimer, the term of this patent is extended or adjusted under 35 U.S.C. 154(b) by 319 days.

(21) Appl. No.: 17/865,585

(22) Filed: Jul. 15, 2022

(65) Prior Publication Data

US 2022/0353856 A1 Nov. 3, 2022

Related U.S. Application Data

(63) Continuation of application No. PCT/CN2020/077568, filed on Mar. 3, 2020.

(51) Int. Cl.
*H04W 72/044* (2023.01)
*H04W 72/20* (2023.01)
*H04W 72/52* (2023.01)
*H04W 72/542* (2023.01)

(52) U.S. Cl.
CPC ......... *H04W 72/044* (2013.01); *H04W 72/20* (2023.01); *H04W 72/52* (2023.01); *H04W 72/542* (2023.01)

(58) Field of Classification Search
None
See application file for complete search history.

(56) References Cited

U.S. PATENT DOCUMENTS

| 2018/0027429 A1* | 1/2018 | Li ............... H04W 8/24 455/426.1 |
| 2018/0324882 A1 | 11/2018 | Gulati et al. |
| 2019/0082459 A1* | 3/2019 | Faurie ............ H04W 72/20 |
| 2019/0373647 A1* | 12/2019 | Rugeland ....... H04W 72/0446 |

(Continued)

FOREIGN PATENT DOCUMENTS

CN 110679190 1/2020

OTHER PUBLICATIONS

International Search Report issued Dec. 4, 2020 in International (PCT) Application No. PCT/CN2020/077568.

(Continued)

*Primary Examiner* — Srinivasa R Reddivalam
(74) *Attorney, Agent, or Firm* — Crowell & Moring LLP

(57) ABSTRACT

This disclosure relates to methods and devices for allocating resources for sidelink transmission between communication terminals in a wireless communication network. In one implementation, the method may include acquiring a first configuration message with respect to allocating sidelink resources for sidelink transmission between user equipments. The method may further include determining to serve as an anchor user equipment based on the first configuration message. The anchor user equipment may represent a type of user equipment assisting to allocate sidelink resources for other use equipments. The method further include transmitting, to a second user equipment, a resource allocation message with respect to allocating sidelink resources for the second user equipment.

20 Claims, 5 Drawing Sheets

(56) References Cited

U.S. PATENT DOCUMENTS

2020/0389900 A1* 12/2020 Lee ...................... H04W 72/53

OTHER PUBLICATIONS

Written Opinion of the International Searching Authority issued Dec. 4, 2020 in International (PCT) Application No. PCT/CN2020/077568.
AT&T "Resource allocation mechanism" *R1-1812872, 3GPP TSG RAN WG1 Meeting #95*, Nov. 16, 2018, pp. 1, 4-7, parts 1, 4.
3GPP TSG RAN NR "Study on Vehicle-to-Everything(Release 16)" *3GPP TR 38.885 V1.0.2*, Mar. 28, 2019, part 5.3.
Huawei, et al. "Further views on Rel-17 work area on NR sidelink enhancements for V2X and other use cases" *RP-191831, 3GPP TSG RAN Meeting #85*, Sep. 20, 2019.

* cited by examiner

METHOD AND DEVICE FOR ALLOCATING RESOURCES FOR SIDELINK TRANSMISSION

This application is a continuation application of PCT International Application No. PCT/CN2020/077568, filed with the China National Intellectual Property Administration, PRC on Mar. 3, 2020, which is herein incorporated by reference in its entirety.

TECHNICAL FIELD

This disclosure is directed generally to wireless communications and particularly to allocate resources for sidelink transmission between communication terminals including vehicles.

BACKGROUND

Sidelink is a unilateral wireless communication service, i.e., the communication between the communication terminals. Vehicle networking refers to a large scale system for wireless communication and information exchange among vehicles, pedestrians, roadside equipments, and internet in accordance with agreed communication protocols and data exchange standards. The vehicle networking communications enable the vehicles to gain driving safety, improve traffic efficiency, and acquire convenience or entertainment information. The vehicle networking communication may be categorized into three types as per the objects of wireless communication: the communication between vehicles, i.e., vehicle-to-vehicle (V2V); the communication between vehicles and roadside equipments/network infrastructures, i.e., vehicle-to-infrastructure/vehicle-to-network (V2I/V2N); and the communication between vehicles and pedestrians, i.e., vehicle-to-pedestrian (V2P). These types of communications collectively are referred to as vehicle-to-everything (V2X) communication.

In the V2X communication research of 3rd Generation Partnership Project (3GPP), the sidelink based V2X communication method between user equipments is one of the manners to implement the V2X standard, in which traffic data is directly transmitted from a source user equipment to a destination user equipment via an air interface without forwarding by the base station and the core network, as shown in FIG. 1. This V2X communication is referred to as PC5-based V2X communication or V2X sidelink communication.

With the technology advancement and development of the automation industry, the scenarios for V2X communications are further diversified and require higher performance. The advanced V2X services include vehicle platooning, extended sensors, advanced driving (semi-automated driving and full-automated driving), and remote driving. The desired performance requirements may include: supporting data packet with the size of 50 to 12000 bytes, transmission rate with 2 to 50 messages per second, the maximum end-to-end delay of 3 to 500 milliseconds, reliability of 90% to 99.999%, data rate of 0.5 to 1000 Mbps, as well as transmission range of 50 to 1000 meters.

SUMMARY

This disclosure is directed to methods, systems, and devices related to wireless communication, and more specifically, to allocate resources for sidelink transmission between communication terminals.

In one embodiment, a method performed by a first user equipment in a wireless communication network is disclosed. The method may include acquiring a first configuration message with respect to allocating sidelink resources for sidelink transmission between user equipments. The method may further include determining to serve as an anchor user equipment based on the first configuration message. The anchor user equipment may represent a type of user equipment assisting to allocate sidelink resources for other use equipments. The method further include transmitting, to a second user equipment, a resource allocation message with respect to allocating sidelink resources for the second user equipment.

In one embodiment, a method performed by a second user equipment in a wireless communication network is disclosed. The method may include acquiring a second configuration message with respect to allocating sidelink resources for sidelink transmission between user equipments. The method may further include determining to obtain sidelink resource allocation via an anchor user equipment based on the second configuration message. The anchor user equipment may represent a type of user equipment assisting to allocate sidelink resources for other use equipments. The method may further include receiving, from a first user equipment serving as the anchor user equipment, a resource allocation message with respect to allocating sidelink resources for the second user equipment.

In another embodiment, a device for wireless communication may include a memory storing instructions and a processing circuitry in communication with the memory. When the processing circuitry executes the instructions, the processing circuitry is configured to carry out the above methods.

In another embodiment, a computer-readable medium comprising instructions which, when executed by a computer, cause the computer to carry out the above methods.

The above and other aspects and their implementations are described in greater detail in the drawings, the descriptions, and the claims below.

DETAILED DESCRIPTION

The technology and examples of implementations and/or embodiments in this disclosure can be used to improve performance in wireless communication systems. The term "exemplary" is used to mean "an example of" and unless otherwise stated, does not imply an ideal or preferred example, implementation, or embodiment. Section headers are used in the present disclosure to facilitate understanding and do not limit the disclosed technology in the sections only to the corresponding section. Please note that the implementations may, however, be embodied in a variety of different forms and, therefore, the covered or claimed subject matter is intended to be construed as not being limited to any of the embodiments to be set forth below. Please also note that the implementations may be embodied as methods, devices, components, or systems. Accordingly, embodiments of this disclosure may, for example, take the form of hardware, software, firmware or any combination thereof.

Figure 1:
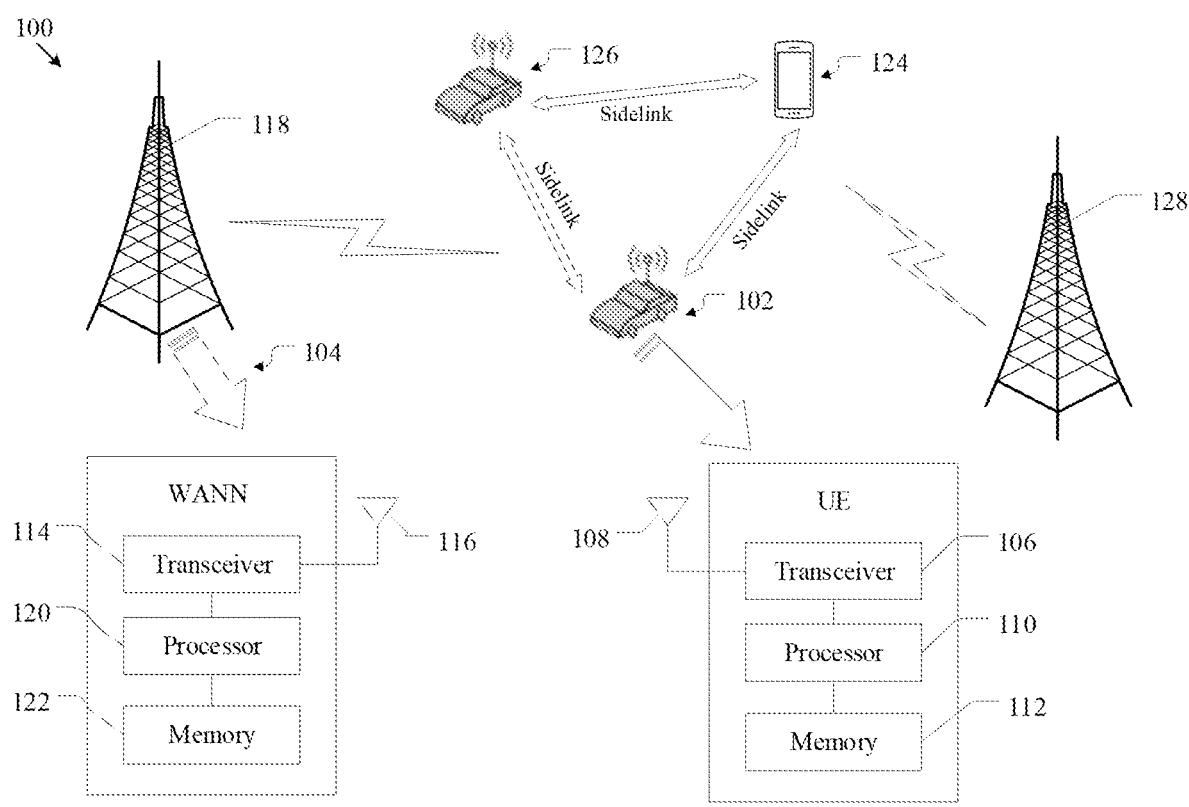
FIG. 1 illustrates an example diagram of a wireless communication network in accordance with various embodiments.

A wireless access network provides network connectivity between a user equipment (UE) and an information or data network such as a text, voice or video communication network, the Internet, and the like. An example wireless access network may be based on cellular technologies, which may further be based on, for example, 4G LTE or 5G NR technologies and/or formats. FIG. 1 shows an example system diagram of wireless communication network 100 including UEs 102, 124, and 126 as well as a wireless access network nodes (WANN) 104 and 128 according to various embodiments. The UEs 102, 124, and 126 may include but is not limited to a mobile phone, smartphone, tablet, laptop computer, a vehicle on-board communication equipment, roadside communication equipment, a smart electronics or appliance including an air conditioner, a television, a refrigerator, an oven, or other devices that are capable of communicating wirelessly over a network. The UEs may directly communicate with each other via the sidelinks. Take the UE 102 as an example, it may include transceiver circuitry 106 coupled to an antenna 108 to effect wireless communication with the wireless access network node 104. The transceiver circuitry 106 may also be coupled to a processor 110, which may also be coupled to a memory 112 or other storage devices. The memory 112 may store therein instructions or code that, when read and executed by the processor 110, cause the processor 110 to implement various ones of the methods described herein.

Similarly, the WANNs 104 and 128 may comprise a base station or other wireless network access points capable of communicating wirelessly over a network with one or more UEs. The WANNs may comprise a 4G LTE base station, a 5G NR base station, a 5G central-unit base station, or a 5G distributed-unit base station. Each type of these WANNs may be configured to perform a corresponding set of wireless network functions. The set of wireless network functions between different types of wireless access network nodes may not be identical. The set of wireless network functions between different types of wireless access network nodes, however, may functionally overlap. Take the WANN 104 as an example, it may include transceiver circuitry 114 coupled to an antenna 116, which may include an antenna tower 118 in various approaches, to effect wireless communication with the UEs 102, 124, or 126. The transceiver circuitry 114 may also be coupled to one or more processors 120, which may also be coupled to a memory 122 or other storage devices. The memory 122 may store therein instructions or code that, when read and executed by the processor 120, cause the processor 120 to implement various ones of the methods described herein.

For simplicity and clarity, only two WANNs and three UEs are shown in the wireless communication network 100. It will be appreciated that multiple WANNs may exist in the wireless communication network, and each WANN may serve one or more UEs in the meantime. For example, the WANN 118 is serving the UEs 102, 124, and 126. For another example, the WANN 118 is serving the UEs 102 and 126 while the WANN 128 is serving the UE 124. Besides UEs and WANNs, the network 100 may further comprise any other network nodes with different functions such as the network nodes in core network of the wireless communication network 100. In addition, while various embodiments will be discussed in the context of the particular example wireless communication network 100, the underlying principle applies to other applicable wireless communication networks.

In the sidelink communication such as V2X communication between UEs, the UEs need to frequently monitor a sidelink transmission resource pool of the UE, for example by way of sensing, so as to obtain sidelink transmission resource from the sidelink transmission resource pool, which incurs huge power consumption and low efficiency. One of the objectives of the present disclosure is to reduce the power consumption of the UEs in obtaining sidelink transmission resources. For example, the UE may request another UE serving as an anchor user equipment to assist to allocate sidelink resources for the UE. In this way, another UE serving as an anchor user equipment may, for example, take charge of sensing the sidelink transmission resource pool for the UE. Accordingly, it is not necessary for the UE to frequently sense the sidelink transmission resource pool, and thus the related power consumption is saved.

First Embodiment

Figure 2:
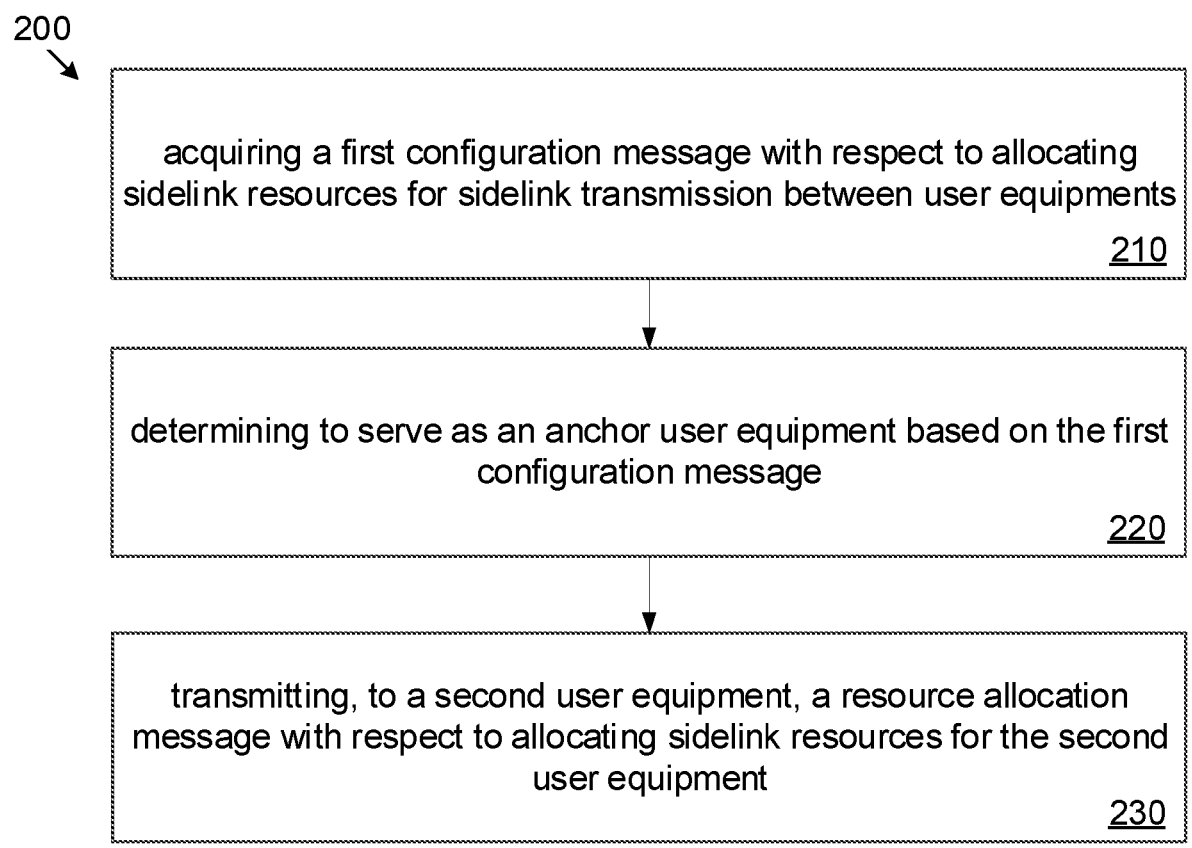
FIG. 2 illustrates a flow diagram of a method for allocating resources for sidelink transmission in accordance with an embodiment.

FIG. 2 illustrates an exemplary implementation 200 for allocating resources for sidelink transmission of the user equipments. Various operations of a first user equipment such as the UE 102 that serves as an anchor user equipment to assist to allocate sidelink resources for other user equipments will be described with reference to FIG. 1 and FIG. 2

Specifically, the UE 102 may acquire a first configuration message with respect to allocating sidelink resources for sidelink transmission between user equipments (210). For example, the UE 102 may acquire the first configuration message from a WANN such as the WANN 118. Alternatively, the UE 102 may preconfigure the first configuration message. As a result, the UE 102 may acquire the first configuration message locally.

Then, the UE 102 may determine to serve as an anchor user equipment based on the first configuration message (220). The anchor user equipment may represent a type of user equipment that assists to allocate sidelink resources for other use equipments The first configuration message may provide satisfaction conditions that the UE 102 is qualified to serve as an anchor user equipment to assist to allocate sidelink resources for other user equipments or a specific user equipment such as the UE 124. The first configuration message may include, for example, the following items:

an indication whether the WANN 118 supports a mode of user equipment assisting to allocate sidelink resources for other use equipments, a first channel quality threshold indicating that the UE 102 could serve as the anchor user equipment only when a channel quality between the UE 102 and a cell serving the UE 102 is higher than or equal to the first channel quality threshold, a second channel quality threshold indicating that the UE 102 could serve as the anchor user equipment to assist to allocate sidelink resources for the UE 124 only when a channel quality between the UE 102 and the UE 124 is higher than or equal to the second channel quality threshold, a geographical distance threshold indicating that the UE 102 could serve as an anchor user equipment to assist to allocate sidelink resources for the UE 124 only when a geographical distance between the UE 102 and the UE 124 is lower than or equal to the geographical distance threshold, a zone disparity threshold indicating that the UE 102 could serve as an anchor user equipment to assist to allocate sidelink resources for the UE 124 only when a zone disparity between the UE 102 and the UE 124 is lower than or equal to the zone disparity threshold, an indication whether the UE 102 and the UE 124 are being served in a same cell, an indication whether the UE 102 and the UE 124 are located within a same zone, an indication whether the UE 102 and the UE 124 belong to a same sidelink communication group, an indication that the UE 102 could serve as an anchor user equipment only when the UE 102 serves as a relay user equipment or a road side unit user equipment, and an indication that the UE 102 could only assist to allocate sidelink resources for user equipments that have established unicast or groupcast connections with the UE 102.

The aforementioned items can be used separately or in any proper combination to determine whether the UE 102 is qualified to serve as an anchor user equipment. For example, if the UE 102 serves as a relay user equipment or a road side unit user equipment, i.e., supporting relay function or road side unit function, the UE 102 may determine to serve as an anchor user equipment to assist to allocate sidelink resources for other user equipments. For another example, the UE may determine to serve as an anchor user equipment to assist to allocate sidelink resources for the UE 124 when the UE 102 and the UE 124 are being served in a same cell and the channel quality between the UE 102 and the UE 124 is higher than the second channel quality threshold.

The thresholds included in the first configuration message, such as a first channel quality threshold, a second channel quality threshold, a geographical distance threshold, and a zone disparity threshold, may represent the enter thresholds that qualify the UE 102 to serve as an anchor user equipment. Accordingly, the first configuration message may also include corresponding release thresholds that disqualify the UE 102 from serving as an anchor user equipment. For example, where a channel quality between the UE 102 and a cell serving the UE 102 is lower than the a first channel quality release threshold, the UE 102 may be disqualified from serving as an anchor user equipment. Generally, a release threshold value is less than a corresponding enter threshold value. For example, the release threshold value may equal to the corresponding enter threshold value minus/plus a positive/negative offset.

Alternatively, the first configuration message may explicitly indicate the UE 102 to serve as an anchor user equipment to assist to allocate sidelink resources for other user equipments.

For example, the first configuration message may indicate which specific user equipments the UE 102 is capable of assisting to allocate sidelink resources for. For each of the specific user equipments, the first configuration message may include, for example, an identifier of the user equipment;

an identification index indicating an index of the user equipment in a set of user equipments reported to the WANN 118 by the UE 102;

a transmission type indicating that the UE 102 is capable of assisting to allocate sidelink resources for sidelink transmission of the user equipment in the transmission type, which may include, for example, unicast, groupcast, and broadcast;

a destination identifier or destination identifier index indicating that the UE 102 is capable of assisting to allocate sidelink resources for sidelink transmission of the user equipment with the destination identifier or destination identifier index; and a sidelink quality of service information indicating that the UE 102 is capable of assisting to allocate sidelink resources for sidelink transmission of the user equipment with the sidelink quality of service information.

As such, the UE 102 may automatically serve as an anchor user equipment to assist to allocate sidelink resources for specific user equipments.

For another example, instead of directly indicating specific user equipments, the first configuration message may indicate a plurality of source/destination identifiers, each of which may identify one or more user equipments for which the UE 102 is capable of assisting to allocate sidelink resources. A source/destination identifier may refer to a type of sidelink traffic, for example, between two user equipments in unicast or between multiple user equipments in groupcast. For example, a destination identifier of a sidelink transmission in a unicast may identify one destination user equipment, while a destination identifier of a sidelink transmission in a groupcast may identify multiple destination user equipments. For each of the source/destination identifiers, the first configuration message further may include, for example, a source/destination identifier, an destination identification index indicating an index of the destination identifier in a set of destination identifiers reported to the WANN 118 by the UE 102, a transmission type indicating that the UE 102 is capable of assisting to allocate sidelink resources for sidelink transmission of a user equipment identified by the source/destination identifier in the transmission type, a sidelink quality of service information indicating that the UE 102 is capable of assisting to allocate sidelink resources for sidelink transmission of a user equipment identified by the source/destination identifier with the sidelink quality of service information.

Optionally, the UE 102 may need to receive message with respect to transmission resource pool for sidelink communication from the WANN 118. Where the UE 102 fails to receive such message via a system message and the UE 102 is in idle state, the UE 102 may determine not to serve as an anchor user equipment. Alternatively, the UE 102 may enter a radio resource control (RRC) connected state so as to serve as an anchor user equipment.

Referring to FIG. 2, where the UE 102 determines that it can serve as an anchor user equipment to assist to allocate sidelink resources for a second user equipment such as UE 124, the UE 102 may transmit a resource allocation message with respect to allocating sidelink resources for the UE 124 to the UE 124 (230).

The resource allocation message may include, for example, an indication whether allocated sidelink resources can only be used to carry sidelink traffic transmitted to the UE 102, a destination identifier or destination identifier index indicating that a sidelink traffic of the second user equipment with the destination identifier or destination identifier index can use the allocated sidelink resources, a transmission type indicating that a sidelink traffic of the second user equipment with the transmission type can use the allocated sidelink resources, and a sidelink quality of service information indicating that a sidelink traffic of second user equipment with the sidelink quality of service information can use the allocated sidelink resources.

Figure 3A:
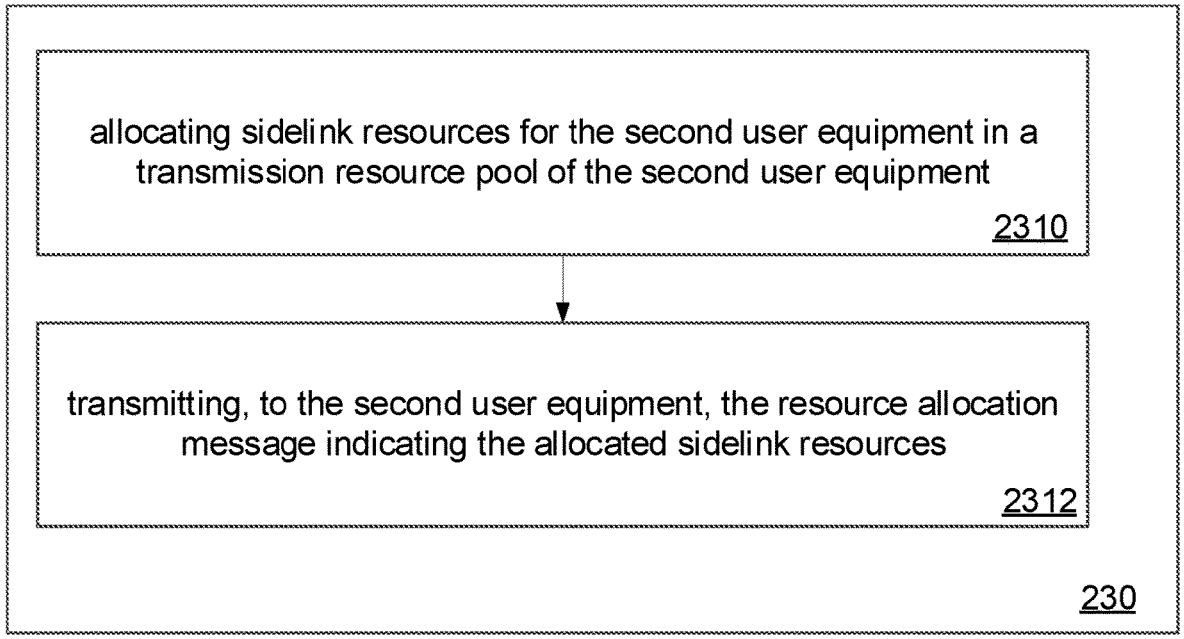
FIG. 3A-3C illustrate flow diagram of a method for allocating resources for sidelink transmission in accordance with an embodiment.
Figure 3B:
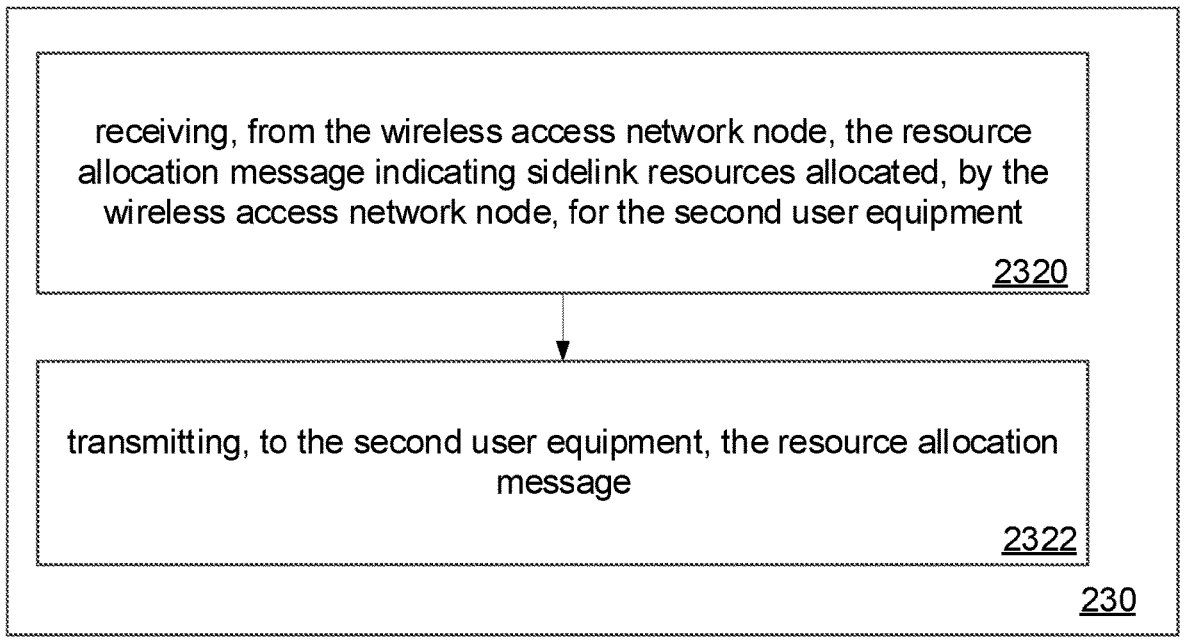
Figure 3C:
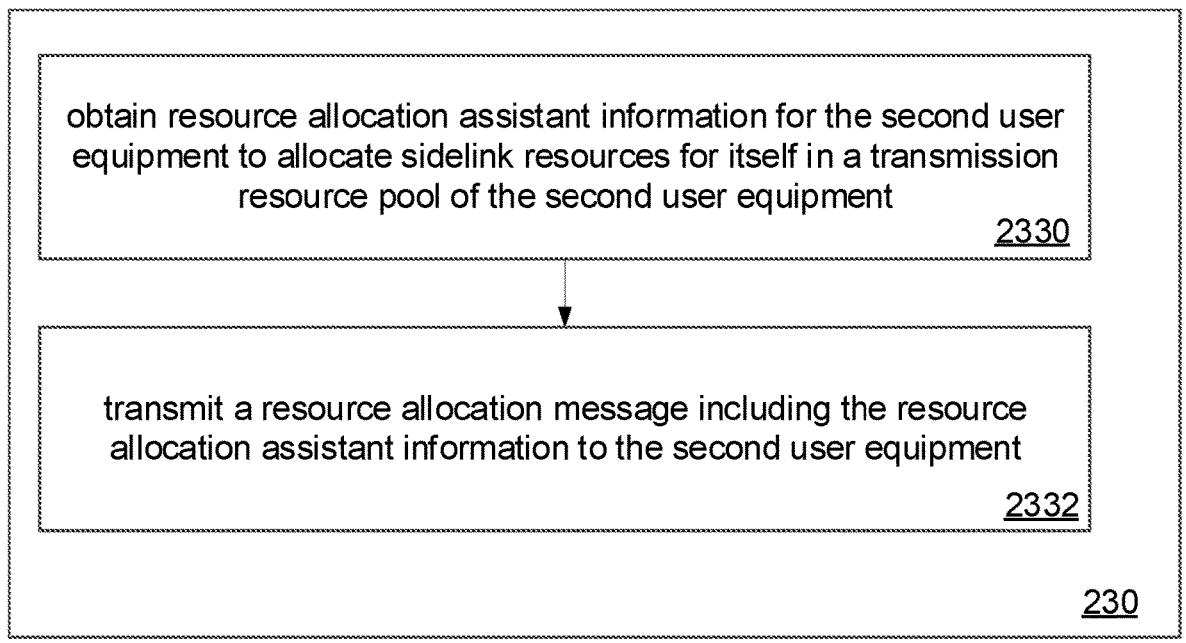

In the exemplary implementation 200, the UE 102 may assist to allocate sidelink resources for the UE 124 in three ways, including (1) the UE 102 may directly allocate the sidelink resources, (2) the UE 102 may forward the sidelink resources allocated by the WANN such as WANN 118, as well as (3) the UE 102 may transmit resource allocation assistant information to the UE 124 such that the UE 124 allocate itself the sidelink resources, which will be respectively described with reference to FIGS. 3A-3C.

Referring to FIG. 3A, the UE 102 may directly allocate sidelink resources for the UE 124. Specifically, the UE 102 may allocate sidelink resources for the UE 124 in a transmission resource pool of UE 124 (2310). The information of the transmission resource pool may be received from the WANN 118. Then, the UE 102 may transmit the resource allocation message indicating the allocated sidelink resources to the UE 124, for example, via a PC5 RRC message (2312). For example, the resource allocation message may include sidelink configured grant configuration information.

Referring to FIG. 3B, the UE 102 may forward sidelink resources allocated by the WANN 118 to the UE 124. Specifically, the UE 102 may receive, from the WANN 118, a resource allocation message indicating the sidelink resources allocated for UE 124 by WANN 118 (2320). Then, the UE 102 may transmit this resource allocation message to the UE 124 (2322).

Referring to FIG. 3C, the UE 102 may obtain resource allocation assistant information for the UE 124 to allocate sidelink resources for itself in a transmission resource pool of the UE 124 (2330). Then, the UE 102 may transmit a resource allocation message including the resource allocation assistant information to the UE 124 (2332). The resource allocation assistant information may indicate, for example, a list of available sidelink resources or a list of unavailable sidelink resources. The list of available sidelink resources may be sorted in terms of channel quality in descending order, i.e., from high quality to low quality.

Return to FIG. 2, optionally, prior to receiving the first configuration message from the WANN 118 (210), the UE 102 may transmit a first assistant information to the WANN 118 to facilitate the WANN 118 to generate the first configuration message. The first assistant information may include, for example, an indication that the UE 102 has a capability of serving as an anchor user equipment to assist to allocate sidelink resources for other user equipments, an indication whether the UE 102 is interested in assisting to allocate sidelink resources for other user equipments, and an indication that the UE 102 is a group header of a groupcast communication group.

The first assistant information may further include, for example, an indication of a set of member information of individual user equipments in a sidelink communication group. The member information of a user equipment in the sidelink communication group may include, for example,
  an identifier of the user equipment;
  assistant information with respect to the user equipment, which may include, for example traffic periodicity, timing offset, message size, sidelink destination index, and sidelink quality of service flow identity;
  sidelink information of the user equipment, which may include, for example, information list of frequencies of interest, destination identity, transmission type, and sidelink quality of service information list;
  power saving information of the user equipment;
  an indication whether the user equipment supports a mode of user equipment assisting to allocate sidelink resources for other use equipments; and
  an indication whether to support to be scheduled resource via a user equipment.

Optionally, prior to transmit the resource allocation message with respect to allocating sidelink resources for the UE 124 to the UE 124 (230), the UE 102 may receive, from the UE 124, assistant information with respect to the UE 124 to facilitate the UE 102 to allocate sidelink resources for the UE 124. The assistant information may include, for example, traffic periodicity, timing offset, message size, sidelink destination identity or identity index, frequency of interest, transmission type, sidelink quality of service flow identity, and power saving information of the UE 124.

Second Embodiment

Figure 4:
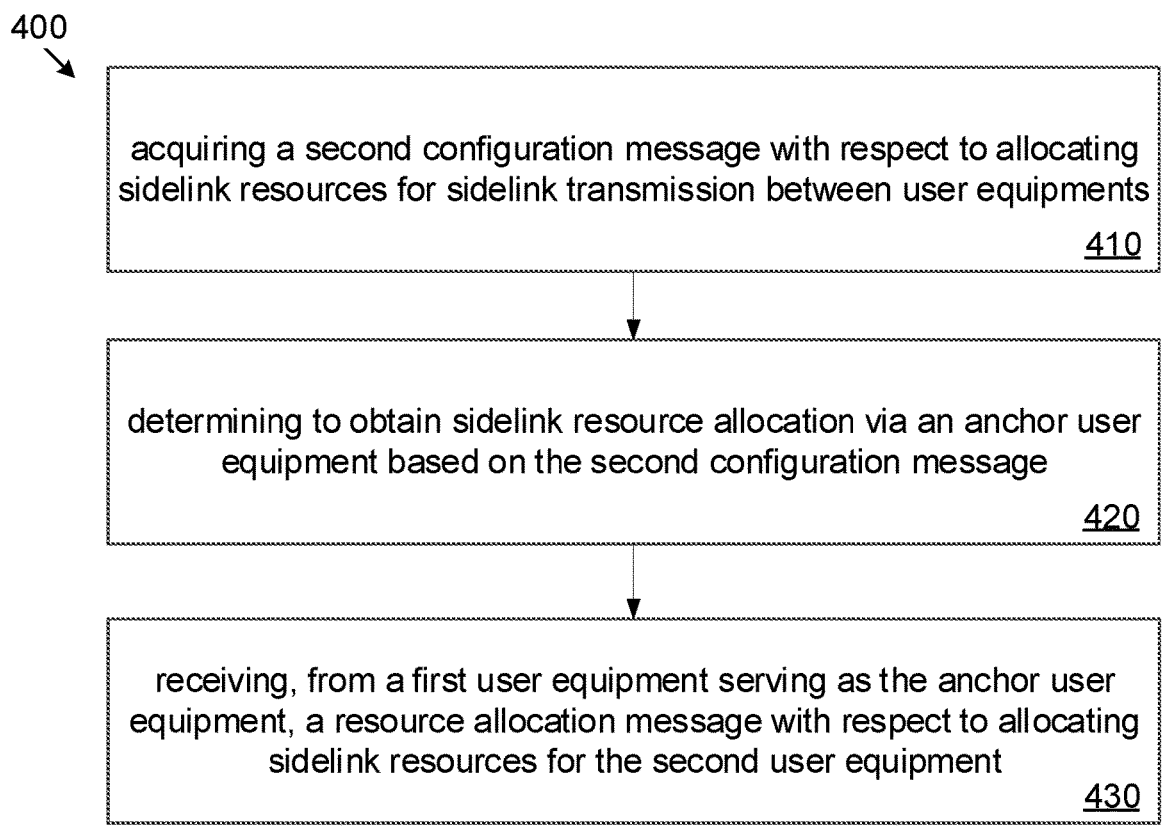
FIG. 4 illustrates a flow diagram of a method for allocating resources for sidelink transmission in accordance with another embodiment.

FIG. 4 illustrates an exemplary implementation 400 for allocating resources for sidelink transmission of the user equipments. Various operations of a second user equipment such as the UE 124 that obtains sidelink resources for its sidelink transmission via an anchor user equipment will be described with reference to FIG. 1 and FIG. 4.

Specifically, the UE 124 may acquire a second configuration message with respect to allocating sidelink resources for sidelink transmission between user equipments (410). For example, the UE 124 may acquire the second configuration message a WANN such as the WANN 118. Alternatively, the UE 124 may preconfigure the second configuration message. As a result, the UE 124 may acquire the second configuration message locally.

Then, the UE 124 may determine to obtain sidelink resource allocation via an anchor user equipment based on the second configuration message (420). The anchor user equipment may represent a type of user equipment assisting to allocate sidelink resources for other use equipments. Then, the UE 124 may receive, from the UE 102 serving as an anchor user equipment, a resource allocation message with respect to allocating sidelink resources for UE 124 (430).

The second configuration message may provide satisfaction conditions that the UE 124 is allowed to obtain sidelink resource allocation via an anchor user equipment or a specific user equipment serving as an anchor user equipment such as the UE 102. The second configuration message may include, for example, the following items:
  an indication whether the WANN 118 supports a mode of user equipment assisting to allocate sidelink resources for other use equipments,
  a first channel quality threshold indicating that the UE 124 could obtain sidelink resource allocation via an anchor user equipment only when a channel quality between the UE 124 and a cell serving the UE 124 is lower than or equal to the first channel quality threshold,
  a second channel quality threshold indicating that the UE 124 could obtain sidelink resource allocation via the UE 102 only when a channel quality between the UE 102 and the UE 124 is higher than or equal to the second channel quality threshold,
  a geographical distance threshold indicating that the UE 124 could obtain the sidelink resource allocation via the UE 102 only when a geographical distance between the UE 102 and the UE 124 is lower than or equal to the geographical distance threshold, a zone disparity threshold indicating that the UE 124 could obtain the sidelink resource allocation via the UE 102 only when a zone disparity between the UE 102 and the UE 124 is lower than or equal to the zone disparity threshold, an indication whether the UE 102 and the UE 124 are being served in a same cell, an indication whether the UE 102 and the UE 124 are located within a same zone, or an indication whether the UE 102 and the UE 124 belong to a same sidelink communication group.

The aforementioned items can be used separately or in any proper combination to determine whether the UE 124 may obtain sidelink resource allocation for its sidelink transmission via an anchor user equipment. For example, if a channel quality between the UE 124 and a cell serving the UE 124 is lower than the first channel quality threshold, the UE 124 may obtain the sidelink resource allocation via an anchor user equipment. For another example, the UE 124 may determine to obtain sidelink resource allocation via the UE 102 serving as an anchor user equipment when the UE 102 and the UE 124 are being served in a same cell and the geographical distance between the UE 102 and the UE 124 is lower than the geographical distance threshold.

Alternatively, the second configuration message may explicitly indicate the UE 124 to obtain sidelink resource allocation via an anchor user equipment.

For example, the second configuration message may indicate which specific user equipments serving as an anchor user equipment are capable of assisting to allocate sidelink resources for the UE 124. For each of the specific user equipments, the second configuration message may include, for example, an identifier of the user equipment;

an identification index indicating an index of the user equipment in a set of user equipments reported to the WANN 118 by the UE 124;

a transmission type indicating that the user equipment is capable of assisting to allocate sidelink resources for sidelink transmission of the UE 124 in the transmission type, and the transmission type may include, for example, unicast, groupcast, and broadcast;

a destination index indicating that the user equipment is capable of assisting to allocate sidelink resources for sidelink transmission of the UE 124 with the destination index; and a sidelink quality of service information indicating that the user equipment is capable of assisting to allocate sidelink resources for sidelink transmission of the UE 124 with the sidelink quality of service information.

For another example, instead of indicating specific user equipments, the second configuration message may indicate a plurality of source identifiers or destination identifiers, each of which may identify one or more user equipments serving as an anchor user equipment to be capable of assisting to allocate sidelink resources for the UE 124. As discussed above, a source/destination identifier may refer to a type of sidelink traffic, for example, between two user equipments in unicast and between multiple user equipments in groupcast. A source/destination identifier may identify one or more source/destination user equipments.

For each of the source/destination identifiers, the second configuration message may include, for example, a source identifier/destination identifier, an identification index indicating an index of the source/destination identifier in a set of source/destination identifiers reported to the WANN 118 by the UE 124, a transmission type indicating that a user equipment identified by the source/destination identifier is capable of assisting to allocate sidelink resources for sidelink transmission of the UE 124 in the transmission type, and a sidelink quality of service information indicating that a user equipment identified by the source/destination identifier is capable of assisting to allocate sidelink resources for sidelink transmission of the UE 124 with the sidelink quality of service information.

By way of example, a data structure for the sidelink quality of service information may be defined as follows:

```
SL-QoS-Info ::=                    SEQUENCE {
    sl-QoS-FlowIdentity                SL-QoS-FlowIdentity,
    sl-QoS-Profile                     SL-QoS-Profile
}
SL-QoS-Profile ::=         SEQUENCE {
sl-PQI
sl-GFBR
sl-MFBR
sl-Range
}
SL-PQI ::=                 CHOICE {
    sl-StandardizedPQI         INTEGER (1..83),
    sl-Non-StandardizedPQI     SEQUENCE {
    sl-ResourceType                ENUMERATED {gbr, non-GBR, delayCriticalGBR, spare1}   OPTIONAL,
        sl-PriorityLevel               INTEGER (0..7)                                       OPTIONAL,
        sl-PacketDelayBudget           TEGER (0..1023)                                      OPTIONAL,
        sl-PacketErrorRate             INTEGER (0..9)                                       OPTIONAL,
        sl-AveragingWindow     INTEGER (0..4095)                                            OPTIONAL,
        sl-MaxDataBurstVolume  INTEGER(0..4095)                                             OPTIONAL,
        ...
    }
}
```

Optionally, prior to receiving the second configuration message for the WANN 118, the UE 124 may transmit a second assistant information to the WANN 118 to facilitate the WANN to generate the second configuration message. The second assistant information may include, for example, an indication that the UE 124 has capability of obtaining sidelink resource allocation via an anchor user equipment, an indication whether the UE 124 would obtain sidelink resource allocation via an anchor user equipment, an indication that the UE 124 is a member of a sidelink groupcast communication group, an identifier of a sidelink groupcast communication group of which the UE 124 is a member, an indication of a set of member information of individual user equipments in a sidelink communication group of which the UE 124 is a member, an indication of a group header of a sidelink communication group of which the UE 124 is a member, and a power saving requirement of the UE 124.

The second assistant information may further include, for example, an indication information of a set of candidate user equipments to serve as an anchor user equipment to assist allocate sidelink resources for the UE 124. The indication information of the set of candidate user equipments may include, for example, an identifier of the candidate user equipment, a source/destination identifier of the candidate user equipment, an indication whether the candidate user equipment supports a mode of user equipment assisting to allocate sidelink resources for other user equipments, a channel quality information between the candidate user equipment and the UE 124, a channel quality information between the candidate user equipment and a cell serving the candidate user equipment, a current load rate of the candidate user equipment, a channel busy ratio (CBR) of a transmission resource pool of the candidate user equipment, a resource usage rate of resources to be allocated by the candidate user equipment, a number of the resource to be allocated by the candidate user equipment, a number of user equipments for which the candidate user equipment is serving as an anchor user equipment to assist to allocate sidelink resources, and a geographical location identification of the candidate user equipment.

Third Embodiment

Figure 5:
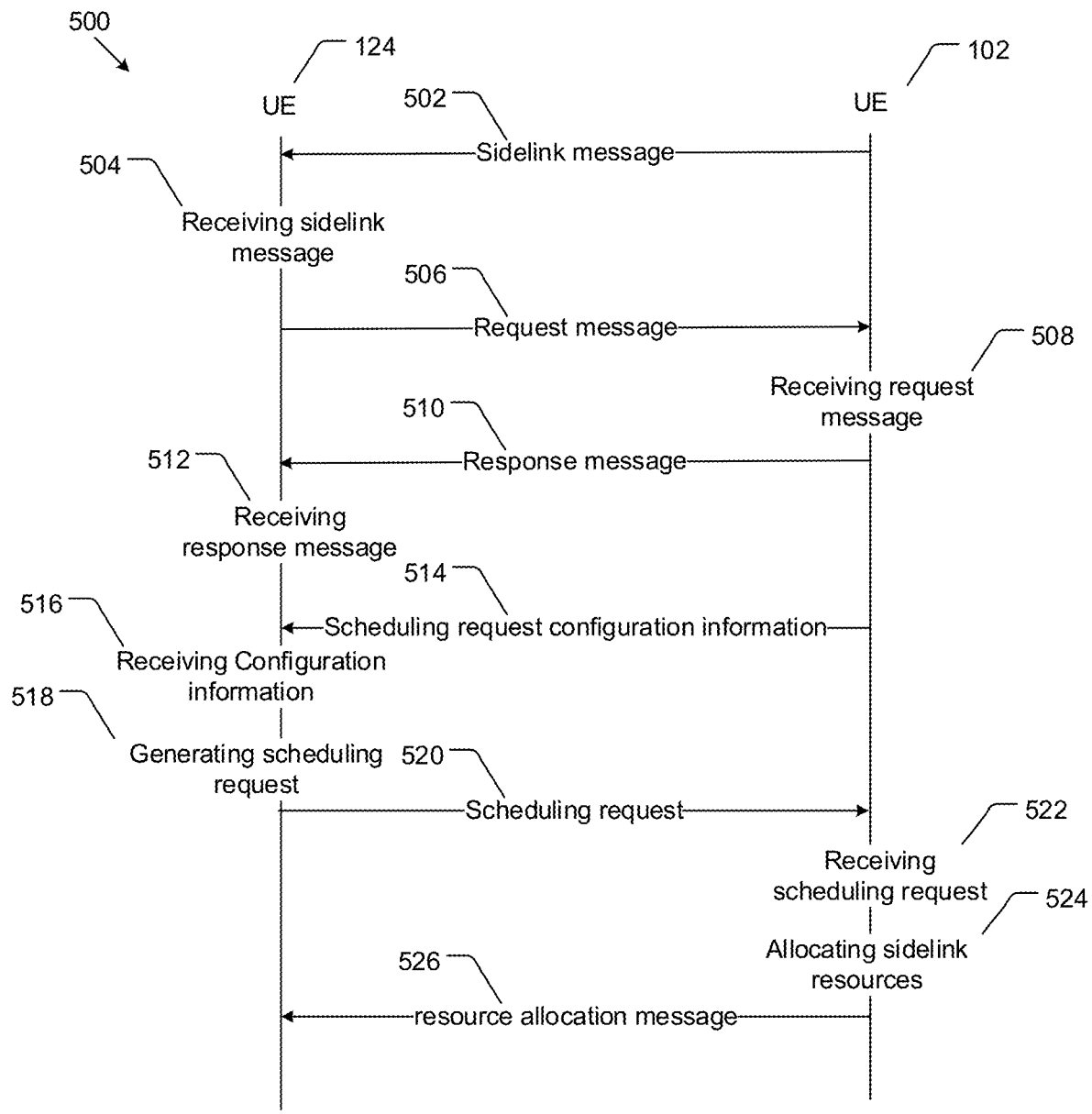
FIG. 5 illustrates a flow diagram of a method for allocating resources for sidelink transmission in accordance with another embodiment.

By way of examples, this embodiment will discuss communication procedures between the UE 102 and the UE 124 in order for the UE 102 to assist to allocate sidelink resources for the UE 124, which will be described with reference to FIG. 5.

Specifically, the UE 102 may transmit a sidelink message indicating that the UE 102 is serving as an anchor user equipment (502). The sidelink message may be carried in a sidelink broadcast message, a sidelink groupcast message, a sidelink RRC message, a PC5-MIB message, or a sidelink control information message. Accordingly, the sidelink message may be transmitted to the UE 124 in the manner of broadcast, groupcast, or unicast.

In some implementations, the sidelink message may include, for example, access control information with respect to the UE 102. The access control information may include, for example, a channel quality between UE 102 and a cell serving the UE 102, a current load rate of the UE 102, a number of user equipments for which the UE 102 is assisting to allocate sidelink resources, a geographical location identification of the UE 102, and a quality of service supported by the UE 102.

Alternatively or additionally, the sidelink message may include, for example, an indication that the UE 102 supports relay function or road side unit function, and a resource allocation mode for the UE 102, which may include, for example, a wireless access network node scheduling resource mode and a user equipment selecting resource mode. The sidelink message may further include, for example, destination identity indicating that the UE 102 is capable of assisting to allocate sidelink resources for sidelink transmission of the UE 124 with the destination identity, a quality of service information indicating that the UE 102 is capable of assisting to allocate sidelink resources for sidelink transmission of the UE 124 with the quality of service information, a transmission type indicating that the UE 102 is capable of assisting to allocate sidelink resources for sidelink transmission of the UE 124 in the transmission type, a serving cell identifier indicating a cell serving the UE 124, a number of allocable resources in a transmission resource pool, a CBR of the transmission resource pool, and a resource usage rate indicating a rate of allocated resources to allocable resources in the transmission resource pool.

The UE 124 may receive the sidelink message indicating that the UE 102 is serving as an anchor user equipment (504). Upon receiving the sidelink message, the UE 124 may transmit to a request message requesting for assisting to allocate sidelink resources for the UE 124 to the UE 102 (506). The request message may include, for example, an identifier of the UE 124, power saving information of the UE 124, sidelink destination index or destination identity to be used by the UE 124 in sidelink transmission, sidelink source index or source identity to be used by the UE 124 in sidelink transmission, sidelink quality of service information to be used by the UE 124 in sidelink transmission, coverage state information indicating that the UE 124 is in coverage or out of coverage of any wireless access network node, a serving cell identifier indicating a cell serving the UE 124, a frequency information list to be used to be used by the UE 124 in sidelink transmission, and a sidelink transmission type to be used by the UE 124 in sidelink transmission.

The UE 102 may receive the request message from the UE 124 (508). In response to the request message, the UE 102 may transmit a response message indicating whether to assist to allocate sidelink resources for the UE 124 to the UE 124 (510).

The UE 124 may receive the response message from the UE 102 (512). Where the response message indicates that the UE 102 would assist to allocate sidelink resources for the UE 124, the response message may include, for example, the following information to facilitate the UE 124 to obtain sidelink resource allocation via the UE 102:

scheduling request configuration set information, which indicates the resource configuration for the UE 124 to transmit scheduling request to the UE 102,
  destination identity list, which indicates that the UE 102 is capable of assisting to allocate sidelink resources for sidelink transmission of the second user equipment with one or more destination identities in the destination identity list,
  a quality of service information, which indicates that the UE 102 is capable of assisting to allocate sidelink resources for sidelink transmission of the UE 124 with the quality of service information,
  a transmission type, which indicates that the UE 102 is capable of assisting to allocate sidelink resources for sidelink transmission of the UE 124 in the transmission type, and
  a range of HARQ process id list indicating that the UE 102 is capable of assisting to allocate sidelink resources for sidelink transmission of the UE 124 with a HARQ process id within the range of HARQ process id list.

Optionally, the response message may further include, for example, information on transmission resource pool of the UE 124.

Optionally, where the response message indicates that the UE 102 would assist to allocate sidelink resources for the UE 124, the UE 102 may separately transmit the scheduling request configuration information to the UE 124 (514).

The UE 124 may receive the scheduling request configuration information from the UE 102 (516). Then, when the UE 124 needs to perform a sidelink transmission, the UE 124 may generate a scheduling request for the sidelink transmission based on the received scheduling request configuration information (518) and transmit the scheduling request to the UE 102 (520).

In response to receiving the scheduling request (522), the UE 102 may, for example, allocate sidelink resources in the transmission resource pool of the UE 124 (524) and transmit the resource allocation message including information of the allocated sidelink resources to the UE 124 (526).

Alternatively, the UE 102 may transmit a buffer status report configuration information to the UE 124. The UE 124 may then generate a buffer status report based on the buffer status report configuration information and transmit the buffer status report to the UE 102. In response to receiving the buffer status report, the UE 102 may for example, allocate sidelink resources in the transmission resource pool of the UE 124 (524) and transmit the resource allocation message including information of the allocated sidelink resources to the UE 124 (526).

Optionally, prior to transmit to the request message requesting for assisting to allocate sidelink resources for the UE 124 to the UE 102 (506), if the UE 124 is covered by a WANN such as the WANN 118, the UE 124 may transmit a RRC message to the WANN 118. The RRC message may carry, for example, identifier of the UE 124, identifier of cell serving the UE 124, power saving information of the UE 124, sidelink destination index or destination identity to be used by the UE 124 in sidelink transmission, sidelink quality of service information to be used by the UE 124 in sidelink transmission, frequency information list to be used by the UE 124 in sidelink transmission, and sidelink transmission type to be used by the UE 124 in sidelink transmission.

Then, the UE 124 may receive a RRC message from the WANN 118. The RRC message may indicate whether the UE 124 is allowed to obtain sidelink resource allocation via the UE 102.

Optionally, the RRC message may include, for example, information on transmission resource pool, which indicates the range of transmission resource pool of the UE 124. The RRC message may further include, for example, a transmission type indicating that the UE 102 is capable of assisting to allocate sidelink resources for sidelink transmission of the user equipment in the transmission type;

a destination identity indicating that the UE 102 is capable of assisting to allocate sidelink resources for sidelink transmission of the UE 124 with the destination identity;

a sidelink quality of service information indicating that the UE 102 is capable of assisting to allocate sidelink resources for sidelink transmission of the UE 124 with the sidelink quality of service information; and a range of HARQ process id list indicating that the UE 102 is capable of assisting to allocate sidelink resources for sidelink transmission of the UE 124 with a HARQ process id within the range of HARQ process id list.

Optionally, prior to transmitting, to the UE 124, the response message indicating whether to assist to allocate sidelink resources for the UE 124 (510), the UE 102 may transmit a radio resource control signaling to the WANN 118 to request for the authorization to assist to allocate sidelink resource for the UE 124. The RRC signaling may include, for example, one or more identification information of the UE 124, power saving information of the UE 124; sidelink destination index or destination identity in which the UE 124 is interested, in sidelink transmission; sidelink quality of service information to be used by the UE 124 in sidelink transmission; frequency information list in which the UE 124 is interested, in sidelink transmission; and sidelink transmission type to be used by the UE 124 in sidelink transmission.

Then, the UE 102 may receive, from the WANN 118, a RRC message indicating whether to authorize or allow the UE 102 to assist to allocate sidelink resources for the UE 124. The RRC message may further include, for example, an identification information of user equipments indicating that the UE 102 could assist to allocate sidelink resources for the user equipments, information on a transmission resource pool indicating that the UE 102 assists to allocate sidelink resources in the transmission resource pool, scheduling request configuration set information to configure scheduling request resources for the UE 124, a range of Hybrid Automatic Repeat Request (HARQ) process id list indicating that the UE 102 is capable of assisting to allocate sidelink resources for sidelink transmission of the UE 124 with a HARQ process id within the range of HARQ process id list.

destination identity indicating that the UE 102 is capable of assisting to allocate sidelink resources for sidelink transmission of the UE 124 with the destination identity, a quality of service information indicating that the UE 102 is capable of assisting to allocate sidelink resources for sidelink transmission of the UE 124 with the quality of service information, a transmission type indicating that the UE 102 is capable of assisting to allocate sidelink resources for sidelink transmission of the UE 124 in the transmission type, and a list of sidelink radio bearers (SLRB) or logic channels indicating that the UE 102 is capable of assisting to allocate sidelink resources for the sidelink radio bearers or logic channels of the UE 124.

Fourth Embodiment

By way of examples, this embodiment will discuss the manners that the UE 124 selects a specific user equipment such as the UE 102 to assist to allocate sidelink resources for the UE 124 when multiple user equipments are available to serve as an anchoring user equipment to assist to allocate sidelink resources for the UE 124.

The UE 124 may receive sidelink messages from a plurality of user equipments such as the UEs 102, 126, and 130. The sidelink message may indicate that the user equipment is serving as an anchor user equipment and may include information indicating its qualification to serve as an anchor user equipment. For example, the sidelink message may include an indication whether the user equipment is a group header of sidelink communication group. Then, based on the sidelink messages, the UE 124 may identify which one of the plurality of user equipments is a group header of a sidelink communication group of which the UE 124 is a member. If such user equipment is identified, the UE 124 may directly select the user equipment to assist to allocate sidelink resources for the UE 124.

Alternatively or additionally, the UE 124 may first selecting candidate user equipments meeting a predetermined candidate condition from the plurality of user equipments based on the sidelink messages. The predetermined candidate condition may include, for example, the following items:

- loading rate of the user equipment being lower than a loading rate threshold,
- a number of user equipments for which the user equipment is assisting to allocate sidelink resources is lower than a number threshold,
- channel quality of the user equipment is higher than a channel quality threshold,
- a range of quality of services supported by the user equipment includes a quality of service of a sidelink data that the UE 124 is to transmit,
- resource availability for allocation by the user equipment is more than a resource availability threshold,
- resource usage rate of resources to be allocated by the user equipment is lower than a resource usage rate threshold,
- a CBR of a transmission resource pool of the user equipment is lower than a CBR threshold,
- a list of sidelink group communication destination identifiers includes a sidelink group communication destination identifier of a sidelink data that the UE 124 is to transmit,
- the user equipment and the UE 124 belong to a same sidelink communication group,
- a geographical distance between the user equipment and the UE 124 is less than a geographical distance threshold, or
- the user equipment and the UE 124 are being served in a same cell.

Then, the UE 124 may selecting one of the candidate user equipments assist to allocate sidelink resources of the UE 124 when the candidate user equipment meet a predetermined selection condition, which may include, for example the following conditions:

- the candidate user equipment is a group header of a sidelink communication group.
- the candidate user equipment has a best channel quality between the candidate user equipment and a cell serving the candidate user equipment or between the candidate user equipment and the UE 124,
- the candidate user equipment and the UE 124 belong to a same sidelink communication group,
- the candidate user equipment and the UE 124 are being served in a same cell,
- a resource allocation mode of the candidate user equipment is wireless access network node scheduling mode,
- the candidate user equipment has a most resources available to be allocated,
- the candidate user equipment has a lowest resource usage rate with respect to resources to be allocated by the candidate user equipment,
- a transmission resource pool of the candidate user equipment has a lowest channel busy ratio,
- the candidate user equipment supports a road side unit function, or
- the candidate user equipment supports a relay function.

Optionally, before selecting the candidate user equipments meeting predetermined criteria from the plurality of user equipments, the UE 124 may receive the predetermined criteria from the WANN 118. For example, the UE 124 may receive, from the WANN 118, the metric values such as the loading rate threshold, the number threshold, the a channel quality threshold, a range of quality of services supported by the user equipment, and geographical distance threshold. Alternatively, the metric values may be preconfigured in the UE 124.

Fifth Embodiment

Where the UE 124 is covered by a WANN such as WANN 118 and is in RRC idle state, the UE 124 may determine whether to select the UE 102 to assist to allocate sidelink resources for the UE 124 based on the configuration in the WANN 118.

Specifically, the UE 124 may receive configuration information from the WANN 118, which may include, for example, indication whether the UE 124 supports user equipment assisting to allocate sidelink resources for other use equipments, indication whether the UE 102 and the UE 124 have to being served in a same cell, indication whether the UE 102 and the UE 124 have to be located within a same zone, indication whether the UE 102 and the UE 124 have to belong to a same V2X communication group.

If the configuration requires that the UE 102 and the UE 124 have to being served in a same cell, the UE 124 may select the UE 102 to assist to allocate sidelink resources for the UE 124 only when the UE 124 and the UE 102 are being served in a same cell. As such, the sidelink message transmitted from the UE 102 to the UE 124 may further include, for example, identifier of access cell of the UE 102 or a Public Land Mobile Network (PLMN) identifier.

If the configuration requires that the UE 102 and the UE 124 may being served in different cells, the UE 102 has to be aware of the range of transmission resource pool allocable to the UE 124 and allocate sidelink resources for the UE 124 based on the transmission resource pool.

Subsequently, the UE 124 may transmit a request message requesting for sidelink resource allocation to the UE 102. The request message may further include, for example, the transmission resource pool of the UE 124. After transmitting a response message, the UE 102 may allocate sidelink resources for the UE 124 within in the range of the transmission resource pool of the UE 124.

Sixth Embodiment

Where the UE 124 is out of coverage in any WANN, the UE 124 may indicate to the UE 102 that the UE 124 is out of coverage in any WANN in the request message transmitted to the UE 102. As such, the UE 102 may allocate sidelink resources for the UE 124 based on the transmission resource pool of the UE 102.

Specifically, the UE 102 may transmit a sidelink message indicating that the UE 102 is serving as an anchor user equipment to the UE 124. The sidelink message may include, for example, access control information.

Upon receiving the sidelink message, the UE 124 may transmit a request message requesting for sidelink resource allocation to the UE 102. The request message may include, for example, coverage state information indicating that the UE 124 is out of coverage.

When receiving the request message, the UE 102 may transmit a response message indicating that the UE 102 would assist to allocate sidelink resources for the UE 124 or refuse to assist to allocate sidelink resources for the UE 124.

After transmitting the response message indicating that the UE 102 would assist to allocate sidelink resources for the UE 124, the UE 102 may directly allocate sidelink resources for the UE 124 and transmit information on the allocated sidelink resources to the UE 124.

Seventh Embodiment

An ordinary user equipment such as the UE 124 may select an anchor user equipment so as to obtain sidelink resources for sidelink transmission of the UE 124 via the anchor user equipment. The anchor user equipment may assist to allocate sidelink resources based on result of sensing available transmission resources in the transmission resource pool. Thus, the ordinary user equipment does not have to perform the sensing. Nonetheless, the ordinary user equipment has to be preconfigured with the sidelink resources for the ordinary user equipment to transmit scheduling request to the anchoring user equipment, which will be considered in the context of the following two scenarios:

Scenario 1: with respect to the UEs communicating within a sidelink group, the group header UE or a UE designated by the WANN may serve as an anchor user equipment. In this case, the group information is required to be available to Access Stratum (AS) layer and the anchor user equipment may only allocate sidelink resources for UEs within the group.

Specifically, in the course of setting up the sidelink communication group, each UE newly joining the group may have to inform the group header UE whether it needs an anchor user equipment to assist to allocate sidelink resources for it. Generally, if a UE is out of coverage or in idle sate, and the UE has power saving requirement, then the UE may need an anchor user equipment to assist to allocate sidelink resources for it. If so, the group header UE may consider to assist to allocate sidelink resources for the UE under the following circumstances:

1) Where the group header UE meets predetermined conditions and is in RRC connection state, it may assist to allocate sidelink resources for other UEs. The predetermined conditions may include: the UE could assist to allocate sidelink resources for other UEs, the UE would assist to allocate sidelink resources for other UEs, the channel quality of the UE is higher than a threshold when the group header UE is within coverage, and the geographical distance between the UE allocating sidelink resources and the UE to be allocated sidelink resources is less than a threshold. For example, they are located within a same zone or neighboring zone, being served by a same cell, etc. If the geographical distance is very large, the sensing result may be inaccurate. If the two UEs are not covered within a same cell, scheduling of wireless access network node may interfere with the UEs.

The group header UE may report the group information to the serving WANN, which may include the UEs in the group and which UEs the group header UE needs to assist to allocate sidelink resources for. Subsequent to receiving the authorization from the serving WANN, the group header UE request for sidelink resources for the UEs within the group. For example, the group header UE may report its assistant information and the WANN dynamically schedule resources or semi-persistently allocate resource. The WANN may accurately allocate sidelink resources for every UE to be scheduled. Alternatively, the WANN may allocate a transmission resource pool for the group header UE, which thus may allocate sidelink resources for other UEs in the group based on the transmission resource pool. The WANN may dynamically allocate the transmission resource pool or semi-persistently schedule the transmission resource pool.

2) Where the group header UE does not meet the predetermined conditions, the group header UE may designate another UE within the group to serve as an anchor user equipment to assist to allocate sidelink resources for other UEs within the group.

That said, if the group header UE cannot serve as an anchor user equipment to assist to allocate sidelink resources for other UEs within the group, the group header UE may inform a UE that it does not support a mode of user equipment assisting to allocate sidelink resources for other user equipments and the UE may obtain the sidelink resources in conventional manner. Alternatively, the group header UE may inquire if other UEs within the group meets the predetermined conditions and would serve as an anchor user equipment. If there is such as UE, the group header UE may designate the UE to serve as an anchor user equipment to assist to allocate sidelink resources for other UEs within the group. Upon receiving the designation, the UE serving as the anchor user equipment may report to the WANN, for example, which other UEs are in need of resource scheduling, obtain authorization from the WANN, etc.

3) Where the group header UE meets predetermined conditions but is in RRC idle state or out of coverage of any WANN, the group header UE may assist to allocate sidelink resources in two ways: (a) the group header UE may obtain sidelink resources by sensing and allocate the sidelink resources to other UEs; (b) the group header UE may designate another UE within the group to allocate sidelink resources for other UEs in the group. Additionally, even if the group header UE is within coverage of the WANN, the WANN may configure the group header UE to allocate sidelink resources for other UEs by sensing.

Scenario 2: The WANN may designate a UE to serve as an anchor user equipment, for example, a relay UE, a RSU UE, as well as other UEs that could and would serve as an anchor user equipment.

A UE may report to the WANN its capability to serve as an anchor user equipment in capability information and indicate the UE would assist to allocate sidelink resources for other UEs in a sidelink UE information. Then the WANN may configure the conditions that the UE needs to meet to serve as an anchor user equipment. The conditions may include, for example, the channel quality of the UE is higher than a threshold when the UE is within coverage, and the geographical distance between the UE allocating sidelink resources and the UE to be allocated sidelink resources is less than a threshold. For example, they are located within a same zone or neighboring zone, being served by a same cell, etc. If the geographical distance is large, the sensing result may be inaccurate. If the two UEs are not covered within a same cell, scheduling of wireless access network node may interfere with the UEs.

When the UE determine that it may serve as an anchor user equipment to assist to allocate sidelink resources for other UEs, it may transmit indication information that the UE is serving as an anchor user equipment via SCI or PC5-MIB messages. When the UEs around that have power saving requirements receive the indication information, they may establish unicast connection with the UE and exchange related configuration information via PC5-RCC, for example, PC5 SR configuration information, reception resource pool information, etc. The reception resource pool information may include, for example, the range of resource pool used to transmit sidelink grant, the range of resource pool used to monitor sidelink grant after the UE transmit the PC5 SR.

Where a UE serving as an anchor user equipment, such as the UE 102, is in RRC connection state, the UE may transmit a request message to request a WANN serving the UE, such as the WANN 118, to configure SR resources for other UEs to be allocated sidelink resources and inform the configured SR resources to the other UEs. The request message may include, for example, a number of UEs to be allocated sidelink resources, identifiers of the UEs, etc. Moreover, the UE 102 may allocate multiple SR resources for each UE per traffic types. Specifically, when the UE 102 determine to serve as an anchor user equipment, the WANN 118 may allocate multiple SR resources for the UE 102 beforehand. As such, the UE 102 may allocate SR resources for other UEs when they establish connection with the UE 102. Alternatively, the UE 102 may request the WANN 118 to allocate PC5 SR resources only when some UE establishes connection with the UE 102 to request for sidelink resource allocation.

Where the UE to be allocated sidelink resources, such as the UE 124, is in RRC connection state, the WANN serving the UE, such as the WANN 128, may configure the PC5 SR for the UE. Then, the WANN 128 may inform the UE assisting to allocate sidelink resources for the UE 124, such as the UE 102, of the PC5 SR.

Optionally, the release thresholds may be configured to disqualify a UE, such as the UE 102, to serve as an anchor user equipment, or a UE, such as the UE 124, to obtain sidelink resource allocation via another UE serving as an anchor user equipment. In particular, when the release thresholds are met, the connection between the UE 102 and the UE 124 may be released. Either the UE 102 or the UE 124 may instruct the connection release.

Optionally, aside from assisting to allocate sidelink resources for other UEs, the UE serving as an anchor user equipment may forward the SLRB configuration that the WANN configures for the other UEs.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

The invention claimed is:

1. A method performed by a first user equipment in a wireless communication network, comprising:
   acquiring a first configuration message with respect to allocating sidelink resources for sidelink transmission between user equipments, wherein the first configuration message includes a satisfaction condition that a user equipment is qualified to serve as an anchor user equipment, the anchor user equipment represents a type of user equipment assisting to allocate sidelink resources for other user equipments;
   in response to the first user equipment meeting the satisfaction condition in the first configuration message, determining to serve as the anchor user equipment; and
   transmitting, to a second user equipment, a resource allocation message with respect to allocating sidelink resources for the second user equipment.

2. The method of claim 1, the acquiring the first configuration message comprises:
   receiving, from a wireless access network node, the first configuration message; or
   acquiring the first configuration message preconfigured in the first user equipment.

3. The method of claim 2, further comprising:
   transmitting a sidelink message indicating the first user equipment serving as an anchor user equipment;
   receiving, from the second user equipment, a request message requesting for assisting to allocate sidelink resources for the second user equipment; and
   in response to the request message, transmitting, to the second user equipment, a response message indicating whether to assist to allocate sidelink resources for the second user equipment.

4. The method of claim 3, wherein the response message further comprises at least one of:
   scheduling request configuration set information indicating resource configuration for the second user equipment to transmit scheduling request to the first user equipment,
   destination identity list indicating that the first user equipment is capable of assisting to allocate sidelink resources for sidelink transmission of the second user equipment with one or more destination identities in the destination identity list, a quality of service indicating that the first user equipment is capable of assisting to allocate sidelink resources for sidelink transmission of the second user equipment with the quality of service, and a transmission type indicating that the first user equipment is capable of assisting to allocate sidelink resources for sidelink transmission of the second user equipment in the transmission type, wherein the transmission type comprises at least one of unicast, groupcast, and broadcast.

5. The method of claim 3, wherein the sidelink message further comprises at least one of:

access control information comprising at least one of:
a channel quality between the first user equipment and a cell serving the first user equipment,
a current load rate of the first user equipment,
a number of user equipments for which the first user equipment is assisting to allocate sidelink resources,
a geographical location identification of the first user equipment, and
a quality of service supported by the first user equipment,
an indication that the first user equipment supports relay function or road side unit function,
a resource allocation mode for the first user equipment comprising wireless access network node scheduling resource mode or user equipment selecting resource mode,
a destination identity indicating that the first user equipment is capable of assisting to allocate sidelink resources for sidelink transmission of the second user equipment with the destination identity,
a quality of service indicating that the first user equipment is capable of assisting to allocate sidelink resources for sidelink transmission of the second user equipment with the quality of service,
a transmission type indicating that the first user equipment is capable of assisting to allocate sidelink resources for sidelink transmission of the second user equipment in the transmission type,
a serving cell identifier indicating a cell serving the first user equipment,
a number of allocable resources in a transmission resource pool,
a channel busy ratio of the transmission resource pool,
a resource usage rate indicating a rate of allocated resources to allocable resources.

6. The method of claim 3, further comprising:
prior to transmitting, to the second user equipment, the response message, transmitting, to the wireless access network node, a radio resource control signaling comprising at least one of:
one or more identification information of the second user equipment,
a power saving information of the second user equipment,
a sidelink destination index or destination identity in which the second user equipment is interested in sidelink transmission,
a sidelink quality of service to be used by the second user equipment in sidelink transmission,
a frequency information list in which the second user equipment is interested in sidelink transmission, and
a sidelink transmission type to be used by the second user equipment in sidelink transmission, and receiving, from the wireless access network node, a radio resource control message comprising at least one of:
whether to authorize or allow the first user equipment to assist to allocate sidelink resources for the second user equipment,
an identification information of user equipments indicating that the first user equipments could assist to allocate sidelink resources for the user equipments,
an information on a transmission resource pool indicating that the first user equipment can assist to allocate sidelink resources in the transmission resource pool,
a scheduling request configuration set information for configuring scheduling request resources for the second user equipment,
a destination identity indicating that the first user equipment is capable of assisting to allocate sidelink resources for sidelink transmission of the second user equipment with the destination identity,
a quality of service information indicating that the first user equipment is capable of assisting to allocate sidelink resources for sidelink transmission of the second user equipment with the quality of service information,
a transmission type indicating that the first user equipment is capable of assisting to allocate sidelink resources for sidelink transmission of the second user equipment in the transmission type, and
a list of sidelink radio bearers or logic channels indicating that the first user equipment is capable of assisting to allocate sidelink resources for the sidelink radio bearers or logic channels of the second user equipment.

7. The method of claim 3, wherein the first configuration message comprises at least one of:
an indication whether the wireless access network node supports a mode of user equipment assisting to allocate sidelink resources for other user equipments,
a first channel quality threshold indicating that the first user equipment could serve as the anchor user equipment only when a channel quality between the first user equipment and a cell serving the first user equipment is higher than or equal to the first channel quality threshold,
a second channel quality threshold indicating that the first user equipment could serve as the anchor user equipment to assist to allocate sidelink resources for the second user equipment only when a channel quality between the first user equipment and the second user equipment is higher than or equal to the second channel quality threshold,
a geographical distance threshold indicating that the first user equipment could serve as the anchor user equipment to assist to allocate sidelink resources for the second user equipment only when a geographical distance between the first user equipment and the second user equipment is lower than or equal to the geographical distance threshold,
a zone disparity threshold indicating that the first user equipment could serve as the anchor user equipment to assist to allocate sidelink resources for the second user equipment only when a zone disparity between the first user equipment and the second user equipment is lower than or equal to the zone disparity threshold,
an indication whether the first user equipment and the second user equipment are being served in a same cell,
an indication whether the first user equipment and the second user equipment are located within a same zone, an indication whether the first user equipment and the second user equipment belong to a same sidelink communication group, an indication that the first user equipment could serve as the anchor user equipment only when the first user equipment serves as a relay user equipment or a road side unit user equipment, and an indication that the first user equipment could only assist to allocate sidelink resources for user equipments that have established unicast or groupcast connections with the first user equipment.

8. The method of claim 2, wherein the transmitting the resource allocation message comprises:

receiving, from the wireless access network node, the resource allocation message indicating sidelink resources allocated, by the wireless access network node, for the second user equipment; and transmitting, to the second user equipment, the resource allocation message.

9. The method of claim 1, wherein the transmitting the resource allocation message comprises:

transmitting, to the second user equipment, the resource allocation message comprising a resource allocation assistant information to allocate sidelink resources for sidelink transmission of the second user equipment, wherein the resource allocation assistant information indicates a list of available sidelink resources or a list of unavailable sidelink resources, the list of available sidelink resources is sorted in terms of channel quality in descending order.

10. The method of claim 2, wherein the first configuration message indicates the first user equipment to serve as an anchor user equipment.

11. The method of claim 10, wherein the first configuration message further indicates a plurality of user equipments for which the first user equipment is capable of assisting to allocate sidelink resources, and for each of the plurality of user equipments, the first configuration message further comprises at least one of:

an identifier of the user equipment, an identification index indicating an index of the user equipment in a set of user equipments reported to the wireless access network node by the first user equipment, a transmission type indicating that the first user equipment is capable of assisting to allocate sidelink resources for sidelink transmission of the user equipment in the transmission type, wherein the transmission type comprises at least one of unicast, groupcast, and broadcast, a destination identifier or destination identifier index indicating that the first user equipment is capable of assisting to allocate sidelink resources for sidelink transmission of the user equipment with the destination identifier or destination identifier index, a sidelink quality of service information indicating that the first user equipment is capable of assisting to allocate sidelink resources for sidelink transmission of the user equipment with the sidelink quality of service information.

12. The method of claim 10, wherein the first configuration message further indicates a plurality of source identifiers or destination identifiers, each of which identifies one or more user equipments for which the first user equipment is capable of assisting to allocate sidelink resources, and for each of the plurality of source identifiers or destination identifiers, the first configuration message further comprises at least one of:

a source identifier or destination identifier, a destination identification index indicating an index of the destination identifier in a set of destination identifiers reported to the wireless access network node by the first user equipment, a transmission type indicating that the first user equipment is capable of assisting to allocate sidelink resources for sidelink transmission of a user equipment identified by the source identifier or destination identifier in the transmission type, wherein the transmission type comprises at least one of unicast, groupcast, and broadcast, a sidelink quality of service information indicating that the first user equipment is capable of assisting to allocate sidelink resources for sidelink transmission of a user equipment identified by the source identifier or destination identifier with the sidelink quality of service information.

13. The method of claim 1, further comprises:

transmitting, to the second user equipment, scheduling request configuration information; and the transmitting the resource allocation message comprises:

in response to receiving, from the second user equipment, a scheduling request for sidelink transmission, transmitting, to the second user equipment, the resource allocation message.

14. The method of claim 1, further comprises:

transmitting, to the second user equipment, buffer status report configuration information; and the transmitting the resource allocation message comprises:

in response to receiving, from the second user equipment, the buffer status report, transmitting, to the second user equipment, the resource allocation message.

15. A method performed by a second user equipment in a wireless communication network, comprising:

acquiring a second configuration message with respect to allocating sidelink resources for sidelink transmission between user equipments, wherein the second configuration message includes a satisfaction condition that a user equipment is allowed to obtain sidelink resource allocation via an anchor user equipment, the anchor user equipment represents a type of user equipment assisting to allocate sidelink resources for other user equipments;

in response to the second user equipment meeting the satisfaction condition in the second configuration message, determining to obtain sidelink resource allocation via an anchor user equipment; and receiving, from a first user equipment serving as the anchor user equipment, a resource allocation message with respect to allocating sidelink resources for the second user equipment.

16. The method of claim 15, the acquiring the second configuration message comprises:

receiving, from a wireless access network node, the second configuration message; or acquiring the second configuration message preconfigured in the second user equipment.

17. The method of claim 16, further comprising:

receiving, from the first user equipment, a sidelink message indicating that the first user equipment serves as the anchor user equipment;

in response to receiving the sidelink message, transmitting, to the first user equipment, a request message requesting for assisting to allocate sidelink resources for the second user equipment; and receiving, from the first user equipment, a response message indicating whether to assist to allocate sidelink resources for the second user equipment.

18. The method of claim 16, further comprises:

receiving, from the first user equipment, scheduling request configuration information;

in response to a need for a sidelink transmission, generating a scheduling request for the sidelink transmission based on the scheduling request configuration information; and transmitting, to the first user equipment, the scheduling request.

19. The method of claim 16, further comprising:

prior to receiving, from the wireless access network node, the second configuration message, transmitting, to the wireless access network node, a second assistant information comprising at least one of:

an indication that the second user equipment has capability of obtaining sidelink resource allocation via an anchor user equipment, an indication whether the second user equipment would obtain sidelink resource allocation via an anchor user equipment, an indication that the second user equipment is a member of a sidelink groupcast communication group, an identifier of a sidelink groupcast communication group of which the second user equipment is a member, an indication of a set of member information of individual user equipments in a sidelink communication group of which the second user equipment is a member, an indication of a group header of a sidelink communication group of which the second user equipment is a member, a power saving requirement of the second user equipment, and an indication information of a set of candidate user equipments to serve as an anchor user equipment to assist allocate sidelink resources for the second user equipment.

20. The method of claim 16, further comprising:

receiving, from a plurality of user equipments, sidelink messages indicating that the plurality of user equipments serve as an anchor user equipment;

selecting candidate user equipments meeting predetermined condition from the plurality of user equipments based on the sidelink messages; and selecting one of the candidate user equipments as the first user equipment in response to at least one of:

the candidate user equipment being a group header of a sidelink communication group, the candidate user equipment having a best channel quality between the candidate user equipment and a cell serving the candidate user equipment or between the candidate user equipment and the second user equipment, the candidate user equipment and the second user equipment belonging to a same sidelink communication group, the candidate user equipment and the second user equipment being served in a same cell, a resource allocation mode of the candidate user equipment is wireless access network node scheduling mode, the candidate user equipment having a most resources available to be allocated, the candidate user equipment having a lowest resource usage rate with respect to resources to be allocated by the candidate user equipment, a transmission resource pool of the candidate user equipment having a lowest channel busy ratio, the candidate user equipment supporting road side unit function, and the candidate user equipment supporting relay function.

* * * * *